Dec. 30, 1924.
W. H. CAMP
BALING PRESS
Filed Sept. 10, 1919     11 Sheets-Sheet 1
1,521,429
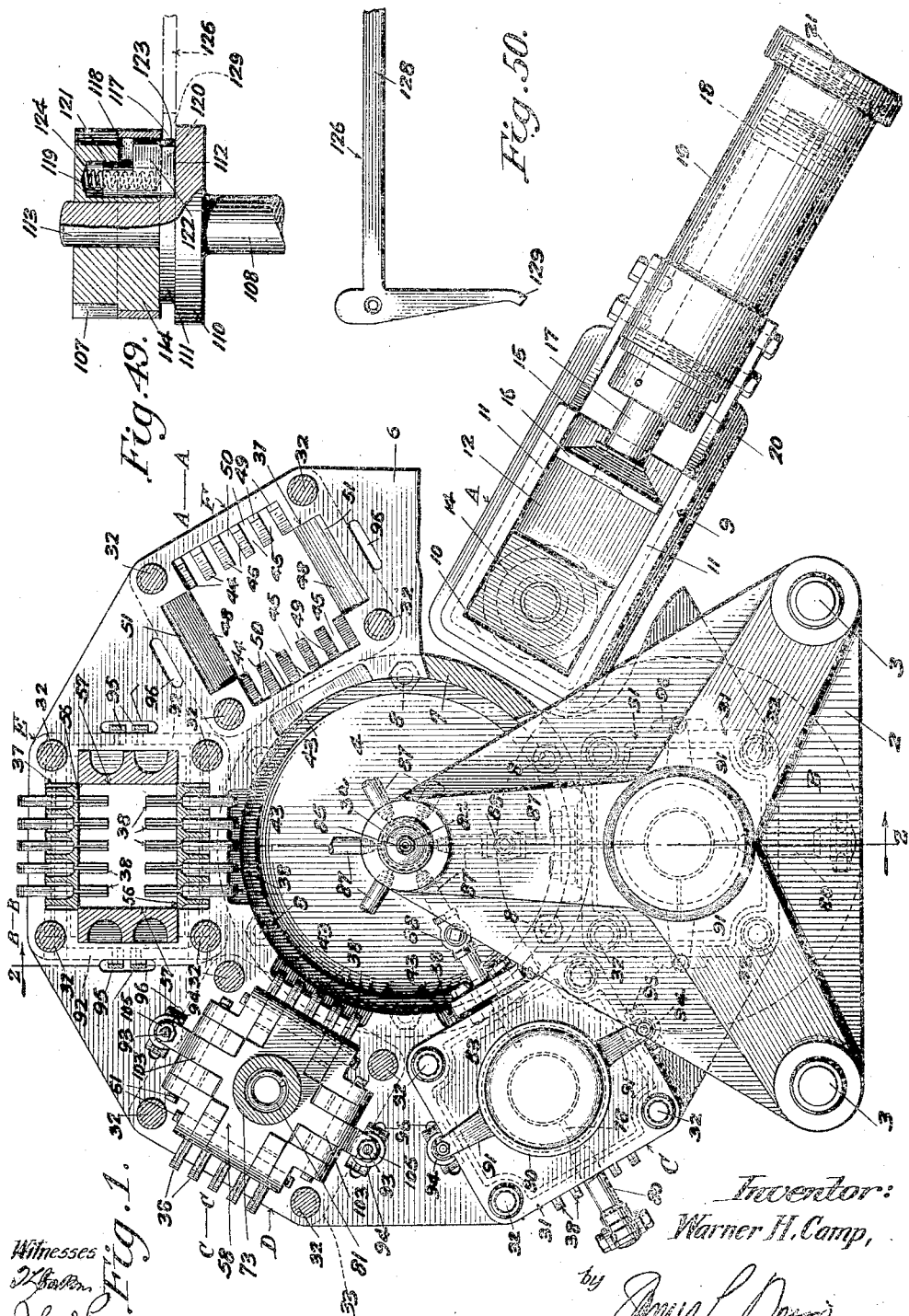
Inventor:
Warner H. Camp,

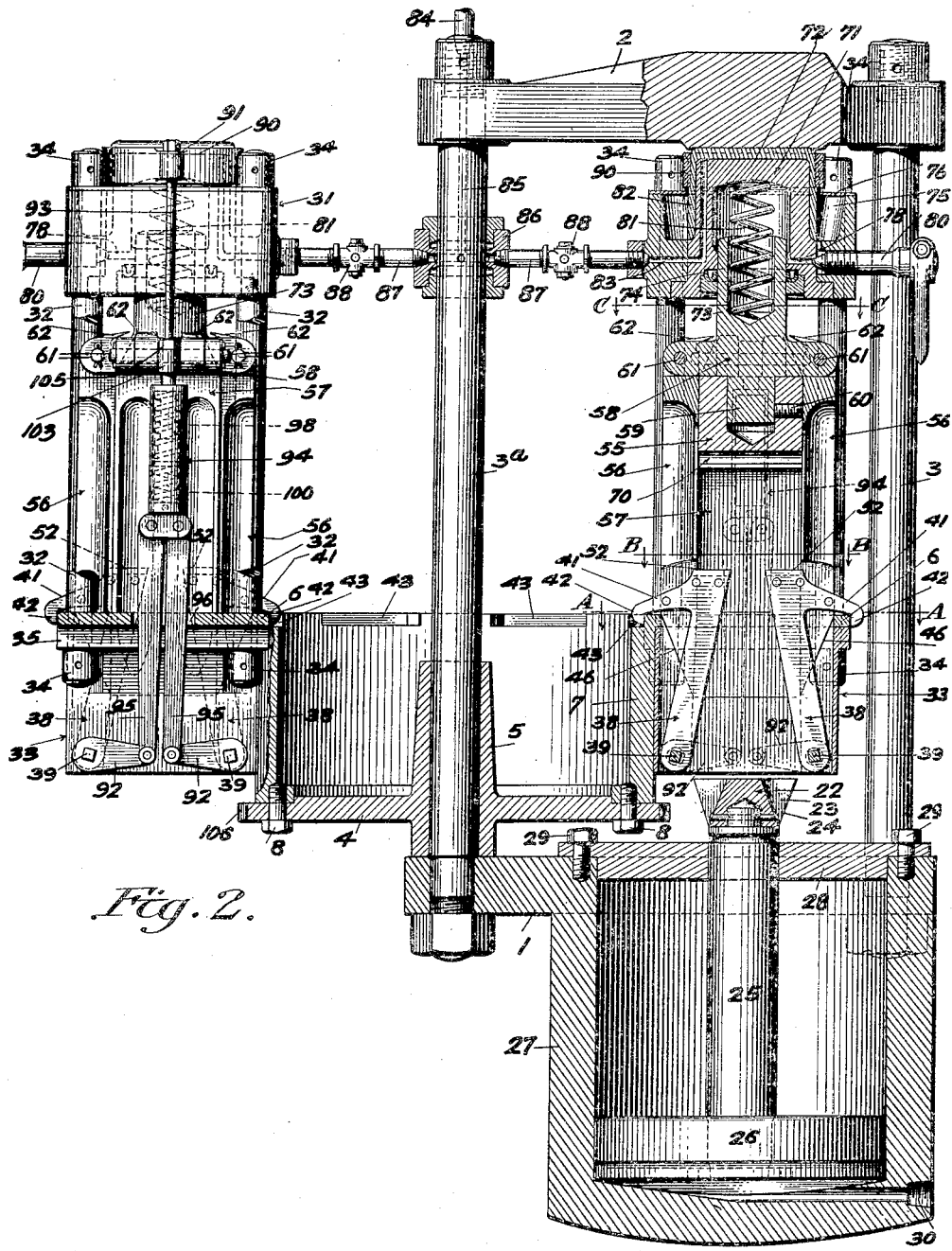

Dec. 30, 1924.
W. H. CAMP
BALING PRESS
Filed Sept. 10, 1919     11 Sheets-Sheet 3
1,521,429
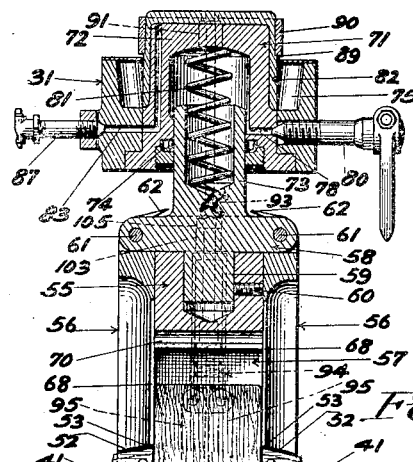
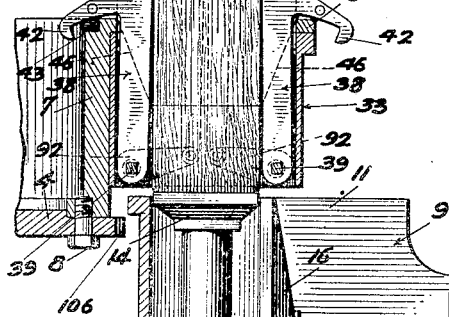
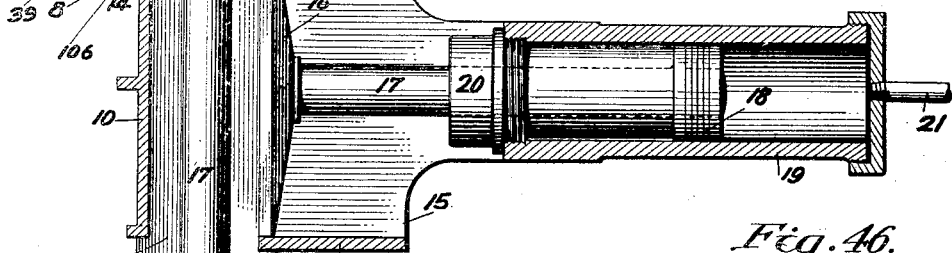
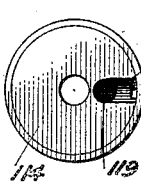
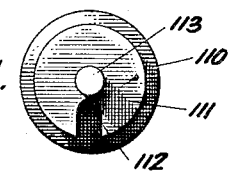
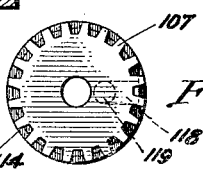
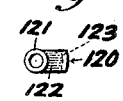
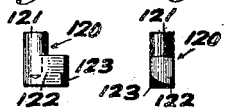
Inventor:
Warner H. Camp,
by
         Attorney.

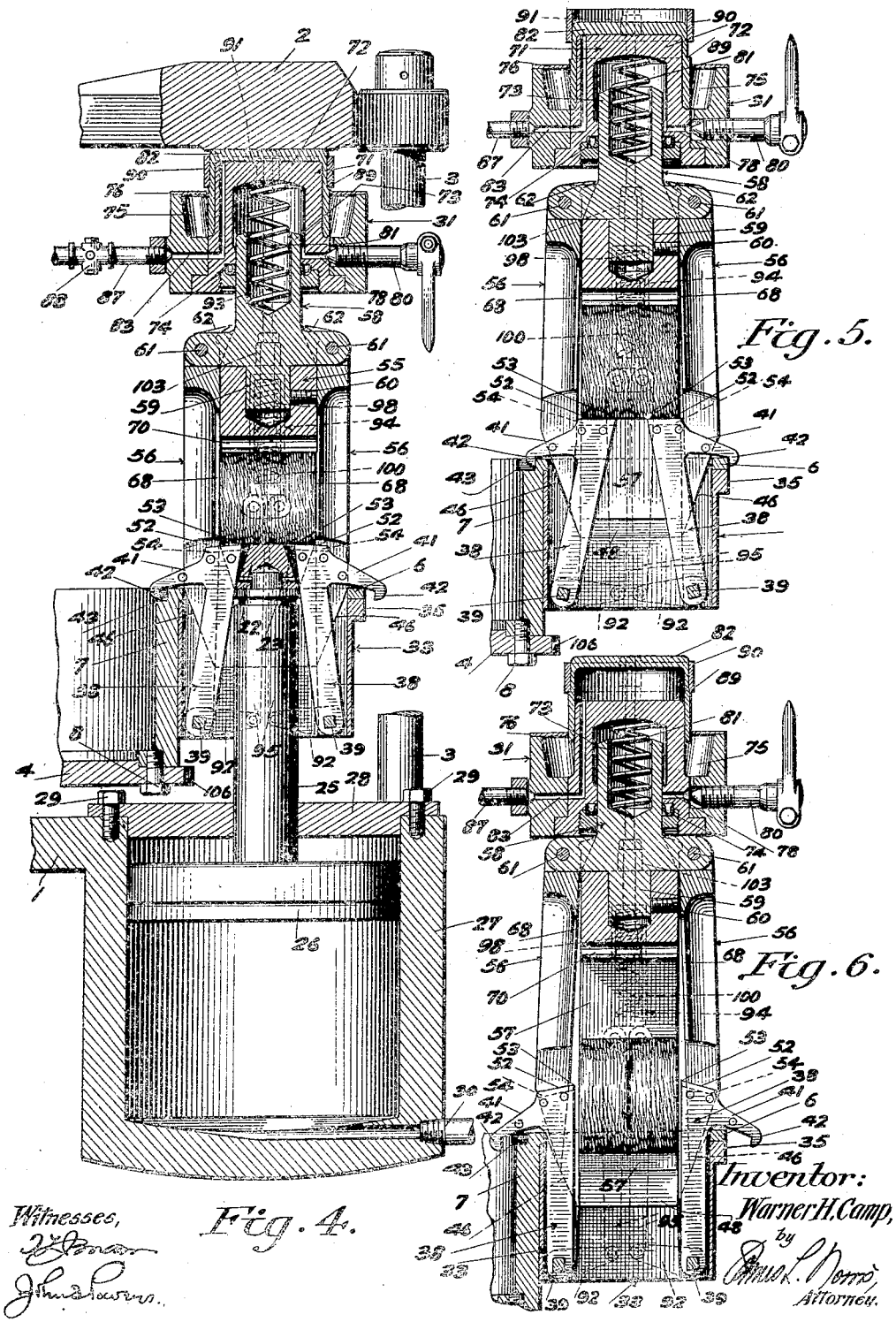

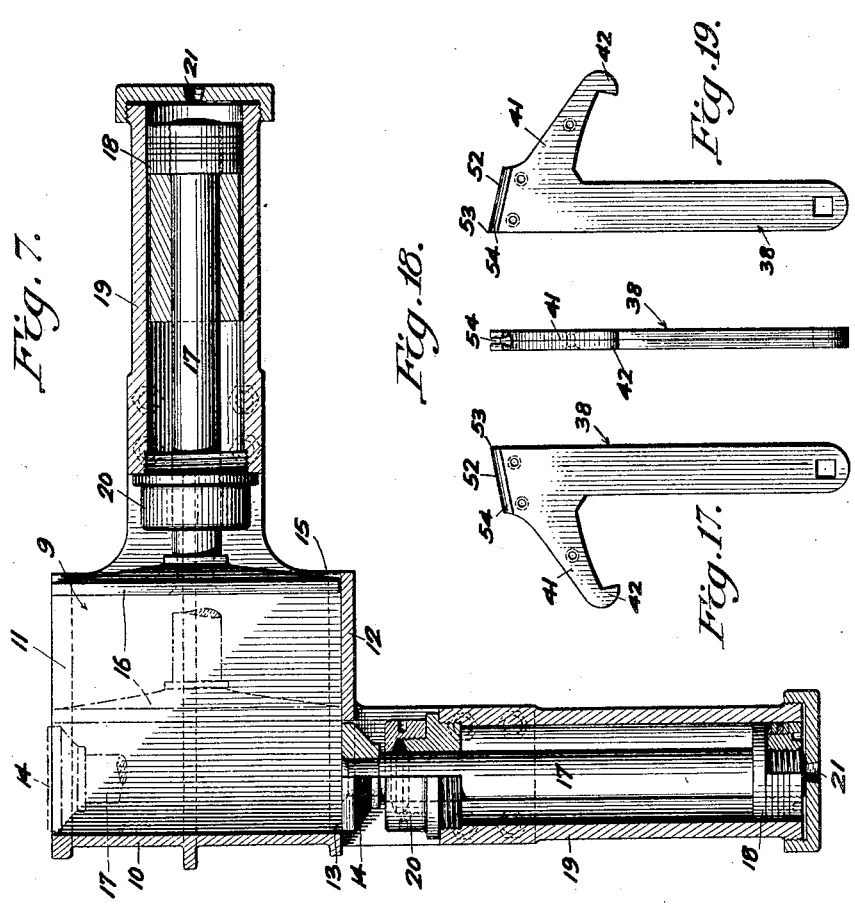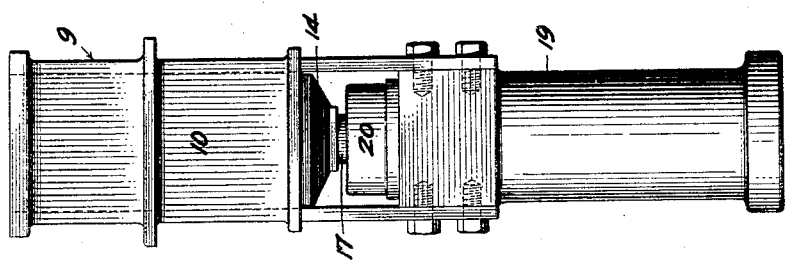

Dec. 30, 1924.

W. H. CAMP

BALING PRESS

Filed Sept. 10, 1919   11 Sheets-Sheet 6

1,521,429

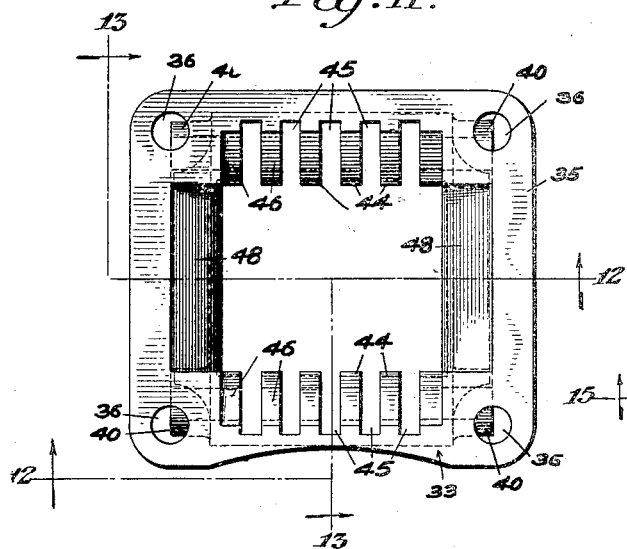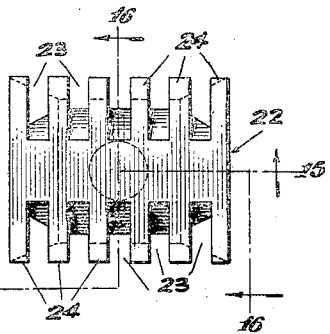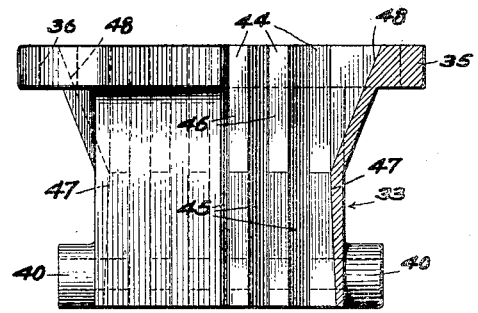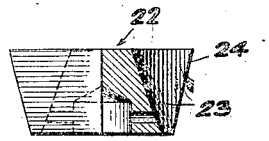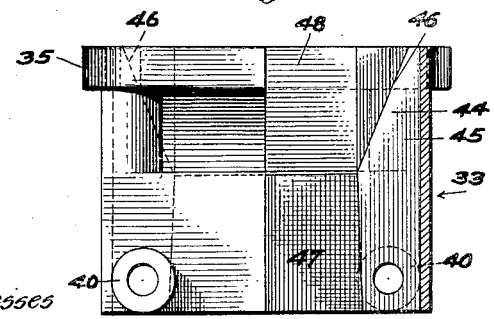

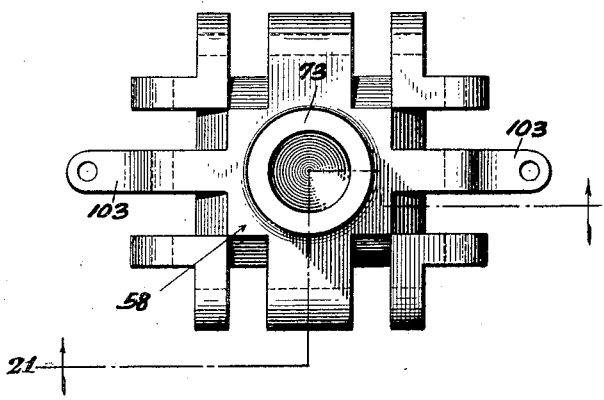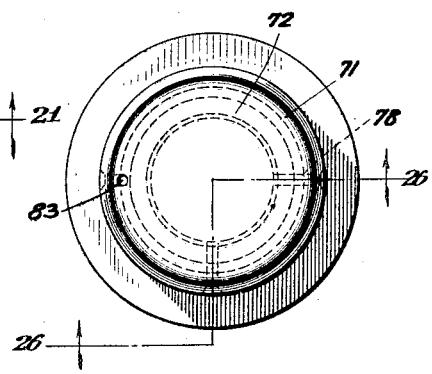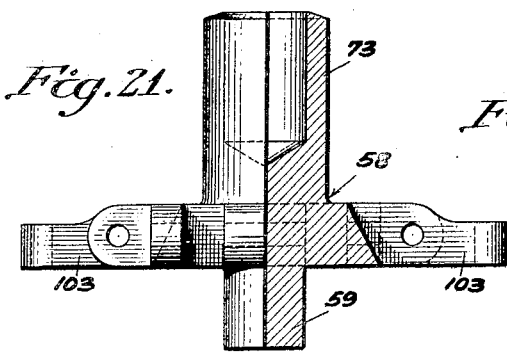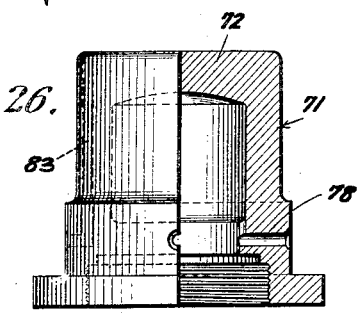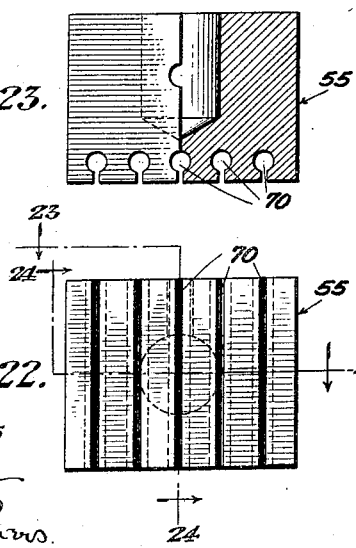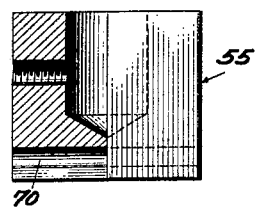

Dec. 30, 1924. 1,521,429
W. H. CAMP
BALING PRESS
Filed Sept. 10, 1919 11 Sheets-Sheet 9
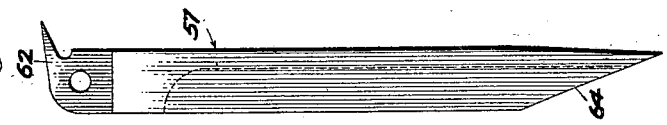
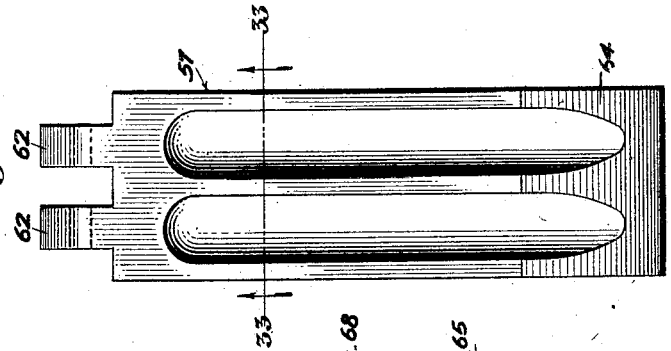
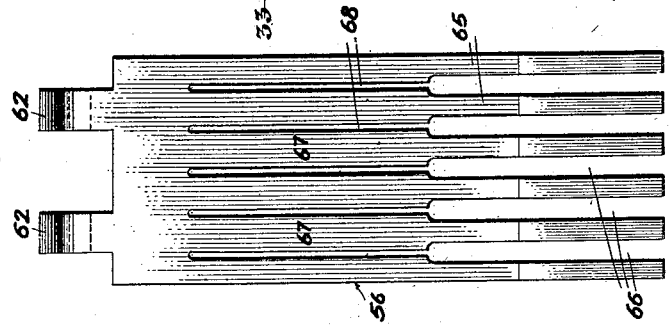
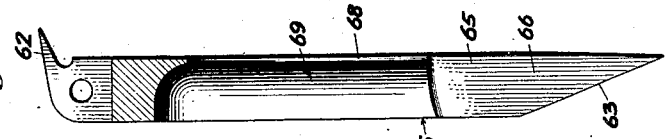
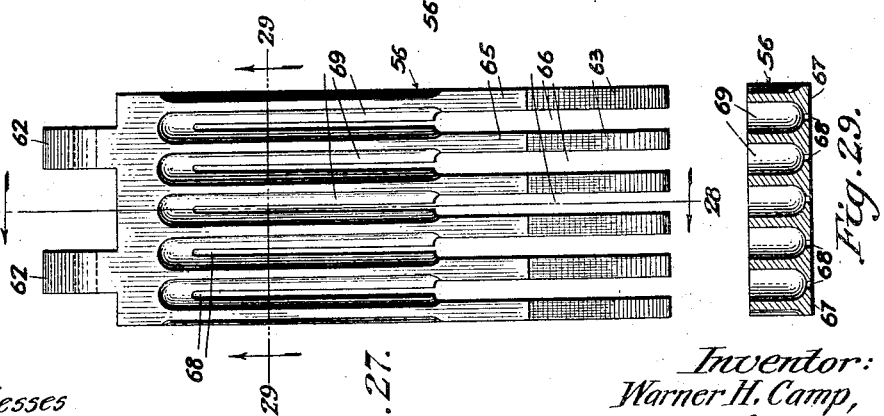
Inventor:
Warner H. Camp,
by
Attorney.

Dec. 30, 1924.

W. H. CAMP

BALING PRESS

Filed Sept. 10, 1919     11 Sheets-Sheet 10

1,521,429

Witnesses

Inventor:
Warner H. Camp,
by
Attorney

Dec. 30, 1924.
W. H. CAMP
1,521,429
BALING PRESS
Filed Sept. 10, 1919    11 Sheets-Sheet 11
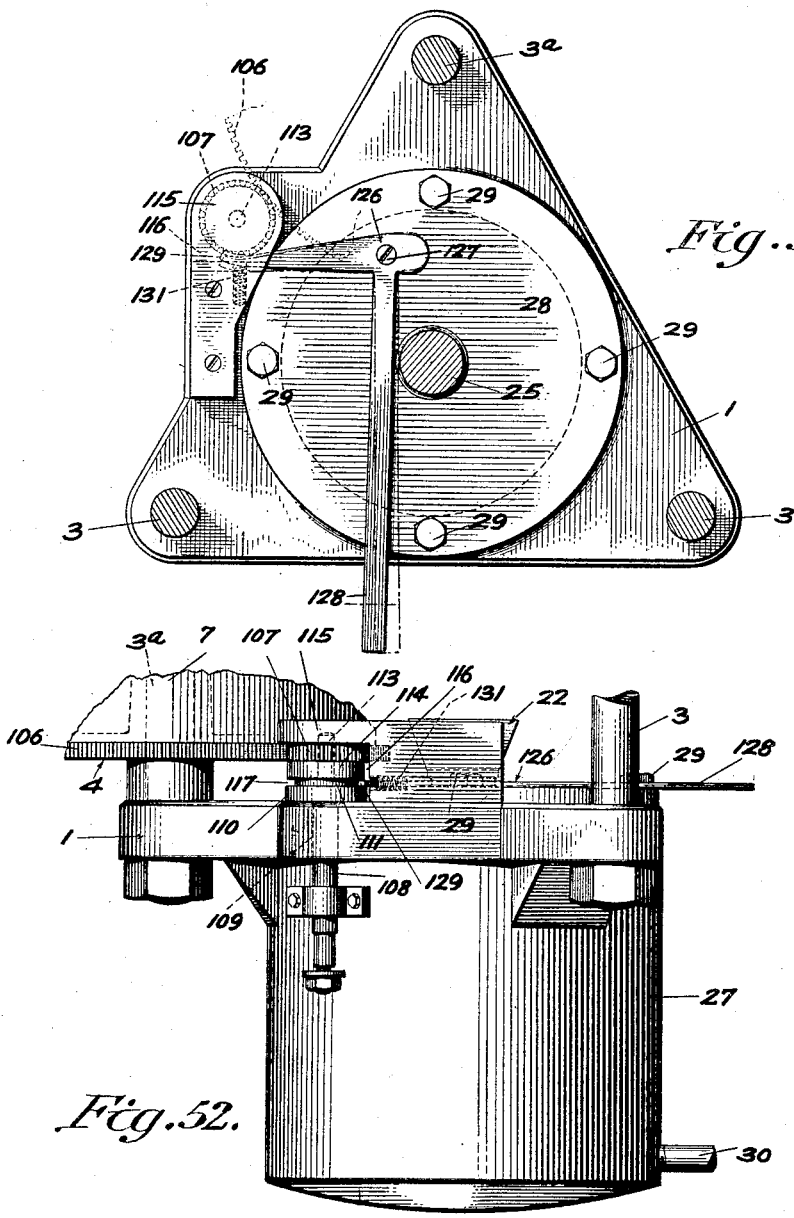

Patented Dec. 30, 1924.

1,521,429

UNITED STATES PATENT OFFICE.

WARNER H. CAMP, OF ATLANTA, GEORGIA, ASSIGNOR, BY MESNE ASSIGNMENTS, TO J. HALL MILLER, OF ATLANTA, GEORGIA.

BALING PRESS.

Application filed September 10, 1919. Serial No. 322,918.

*To all whom it may concern:*

Be it known that I, WARNER H. CAMP, a citizen of the United States, residing at Atlanta, in the county of Fulton and State of Georgia, have invented new and useful Improvements in Baling Presses, of which the following is a specification.

This invention relates to improvements in baling presses for hay or other fibrous material.

The principal objects of the invention are to provide a baling press which has such compactness of structure and organization that it may be readily transported on a flat car, yet which shall compress the bale to a very high density, at least equal to that obtained with very large and heavy stationary presses, and which shall provide a bale of rectangular form; which shall operate with great rapidity and whose output shall be equal to that of the largest stationary presses; which shall require a comparatively small degree of power, yet whose operation shall be automatic in nearly all of its phases, ranging from the preliminary compression of the bale and the loading of the press chamber to the discharge of the finished bale, the manual operations involved being very few and being confined to devices by which the automatic operations are controlled; which in connection with the discharge of the finished bale shall effect a very gradual but certain, uniform and controllable relief of the pressure on the bale; and which, notwithstanding its compactness, in conjunction with its capacity for achieving high density and a maximum output, shall be exceedingly strong and sturdy in its construction.

The above objects are attended with the following advantages:

The high density and rectangular form of the bale effect a substantial measure of economy in the utilization of space available for transportation. The portability of the press in connection with its capacity for a maximum output enables a material reduction in the number of cars and the mileage required in the transport of the fibrous material. Thus finished bales may be produced at the farm or plantation which may be shipped directly to the nearest or most favorable distributing center with the most efficient utilization of the space available for transportation and with an elimination of the relatively great transportation space and mileage required under the practice, heretofore necessary, of shipping the bales as loosely made up in the fields to some distant point for re-baling by a stationary compress and of thereafter shipping them to remote distributing centers. The automatic character and correlation of the principal operations involved reduce to a minimum the requirement for manual labor. The comparatively small degree of power required renders available for the operation of the press any of the motor appliances which form part of the equipment of every farming center. The gradual but certain and uniform relief of the pressure on the finished bale effectively protects the tie-wires from being snapped consequent to the stresses of expansion when the high density bale is relieved, thereby promoting the security of the finished bale and assuring that it shall have the density desired.

The baling press disclosed is of the revoluble turret type according to which a number of press chambers are arranged at intervals about a rotary carrier and the sequential operations in connection with the formation of a bale are concurrently performed upon the various bales in the respective press chambers, the carrier having step-by-step rotation and bringing the press chambers into relation to the successive "stations" at which the different operations are performed.

With the stated objects and advantages in view the invention consists in certain features of structure, combination and relation which will be set forth in detail as the description proceeds. Certain of these features pertain to a baling press of the revoluble-turret type; other features pertain to the preliminary compression and press loading or charging mechanism; and still other features pertain to the high density press unit and various parts appurtenant to and employed in co-operation with said press unit.

An embodiment of the invention is illustrated in the accompanying drawings wherein:—

Figure 1 is a plan view, partly in section, of a baling press in which the features of the invention are incorporated.

Figure 2 is a vertical sectional view on the line 2—2 of Figure 1. The lines A—A, B—B, and C—C of Figure 2 indicate the planes of the respective horizontal sectional views incorporated in Figure 1, reading from the right to the left of said figure.

Figure 3 is a detail vertical sectional view showing the mechanism for preliminarily compressing the bale and loading the press chamber upon the completion of the operation thereof.

Figure 4 is a detail vertical sectional view showing the operation of compressing the bale to high density in the press chamber.

Figure 5 is a similar view showing the press chamber during the preliminary relief of the finished bale just prior to its discharge. Figure 6 is a similar view showing the press chamber during the discharge of the finished bale.

Figure 7 is a detail vertical sectional view of the preliminary compression and loading chamber and the plungers co-operating therewith.

Figure 8 is an end elevation of the preliminary compression and loading chamber.

Figure 11 is a plan view of the lower portion of the press chamber.

Figures 12 and 13 are partial elevations and vertical sections on the respective lines 12—12 and 13—13 of Figure 11.

Figure 14 is a plan view of the high density baling plunger.

Figures 15 and 16 are partial elevations and vertical sections of the respective lines 15—15 and 16—16 of Figure 14.

Figures 17, 18 and 19 (Sheet 5) are views, Figures 17 and 19 side elevations, and Figure 18 an edge elevation of one of the dogs, of which two groups are employed for holding the bale in the press chamber.

Figure 20 is a plan view of the head which carries the platen of the press chamber, said platen co-operating with the high density baling plunger shown in Figures 14–16.

Figure 21 is a partial elevation and vertical section on the line 21—21 of Figure 20.

Figure 22 is a bottom plan view of the platen of the press chamber.

Figures 23 and 24 are partial elevations and vertical sections on the lines 23—23 and 24—24 of Figure 22.

Figure 25 is a plan view of a cylinder for co-operation with a plunger carried by the head shown in Figures 20 and 21.

Figure 26 is a partial elevation and vertical section on the line 26—26 of Figure 25.

Figure 27 is an elevation showing the outer face of one of the vertical movable walls of the press chamber.

Figures 28 and 29 are vertical and horizontal sectional views on the lines 28—28 and 29—29 of Figure 27.

Figure 30 is an elevation showing the inner face of the wall shown in Figure 27.

Figure 31 is an elevation showing the outer face of another of the vertical movable walls of the press chamber and Figure 32 is a side elevation thereof.

Figure 33 is a horizontal section on the line 33—33 of Figure 31.

Figure 9:
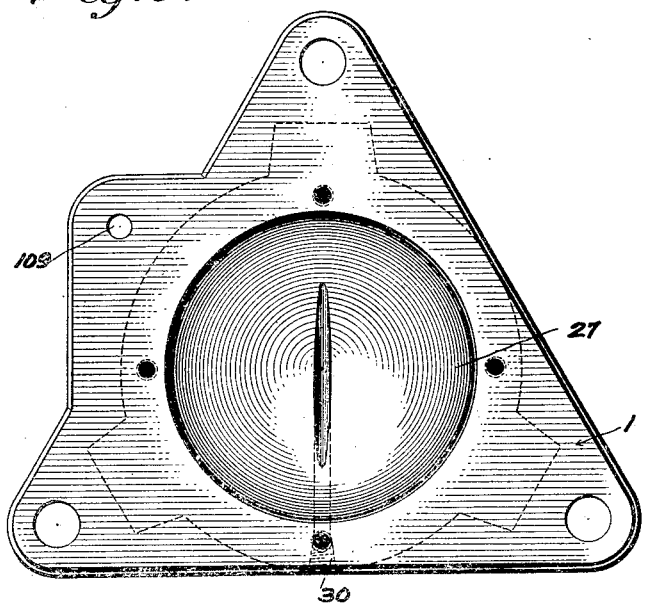
Figure 9 is a plan view and Figure 10 an elevation of the cylinder in which operates the piston of the high density baling plunger.
Figure 10:
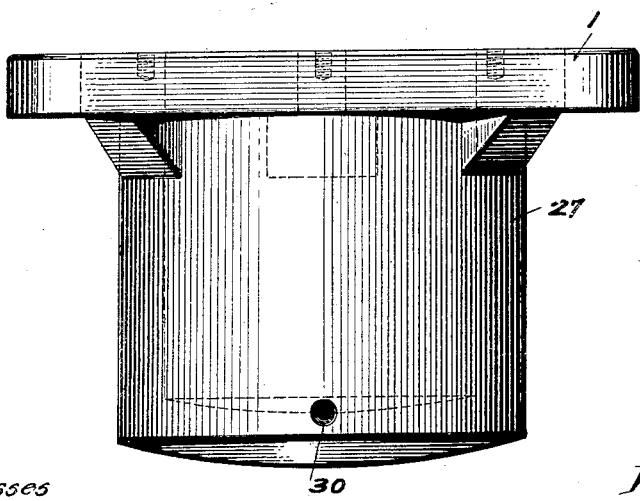
Figure 34:
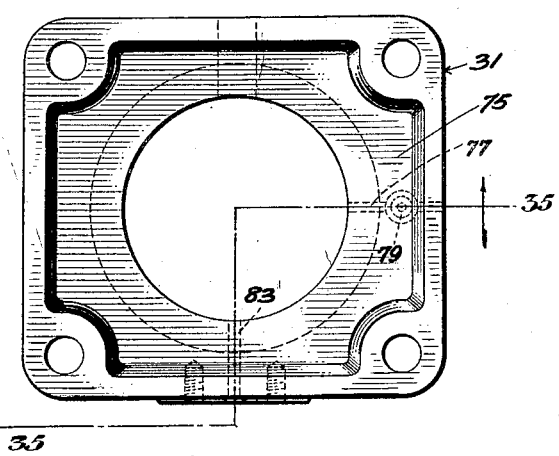

Figure 34 is a plan view of a stationary head which forms an element of each press unit.

Figure 35:
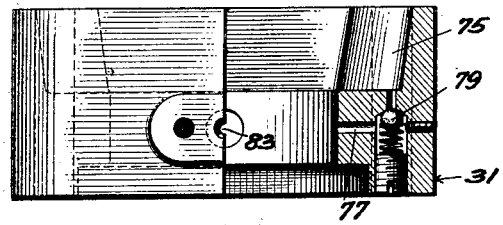

Figure 35 is a partial elevation and vertical section on the line 35—35 of Figure 34.

Figure 36:
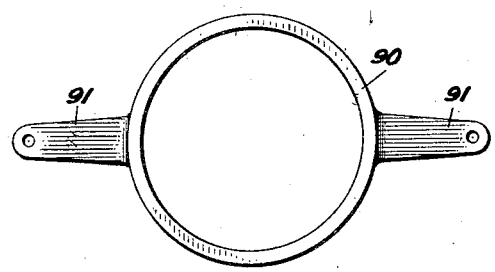
Figure 37:
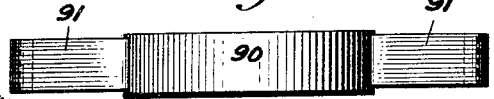

Figures 36 and 37 are, respectively, a plan view and a side elevation of a movable cross head which forms an element of each press unit.

Figures 38, 39:
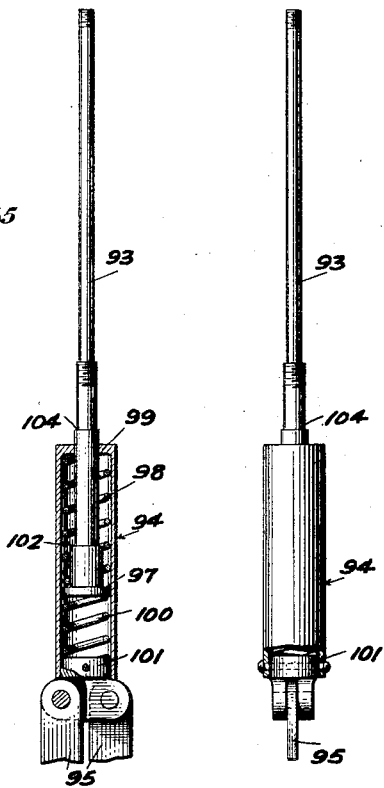

Figure 38 is a vertical sectional view and Figure 39 is an elevation of certain connections between the cross head shown in Figures 36 and 37 and the dogs shown in Figures 17–19.

Figure 40:
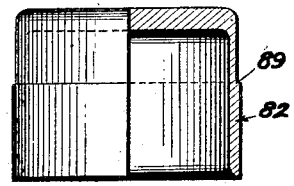

Figure 40 is a partial elevation and vertical section of a cylindrical element upon which the cross head shown in Figures 36 and 37 is mounted.

Figures 41 and 42 (Sheet 3) are plan and side elevations of the constantly rotatable element of a clutch which controls the rotation of the turret.

Figure 43 is a plan view, Figure 44 a vertical section and Figure 45 a bottom plan view of the clutch and gear element companion to the element shown in Figures 41 and 42.

Figure 46 is a plan view, and Figures 47 and 48 are side and end elevations of the pin by which the said clutch elements are connected and disconnected.

Figure 49 (Sheet 1) is a vertical sectional view of the clutch with its elements in operatively connected relation.

Figure 50 (Sheet 1) is a plan view of a lever for controlling the operation of the clutch.

Figure 51 (Sheet 11) is a plan view of the base of the press frame, showing in detail the arrangement thereon of the clutch and its actuating lever by which the rotation of the turret is controlled.

Figure 52 is a side elevation of the structure shown in Figure 51.

Similar characters of reference designate corresponding parts throughout the several views.

*General structure.*—The press disclosed is of the rotary turret type and its main frame (Figures 1 and 2) consists of a base 1, a head 2 and vertical tension rods extending between and connecting the base and the head. There are preferably three tension rods of which two are designated 3 and the third one is designated 3ª and said rods are preferably equidistantly arranged. The rod 3ª is utilized as the axis of rotation of the press unit carrier which, for convenience, may be termed a "turret." The turret (Figures 1 and 2) includes a base 4 provided with a central sleeve 5 which has a rotatable bearing upon the rod 3ª and an end thrust bearing upon the base 1. The turret also includes an annular table 6 which is preferably located at an elevation above the base 4 from which it is supported by a cylindrical flange 7. As shown and preferred the table 6 and flange 7 are formed integral and the flange 7 is secured to the base 4 by screws 8 or other suitable fastenings.

The table is provided with counterpart press units of which any desired number may be employed. As shown and preferred there are six of these units. In the formation of the bale there are certain sequential operations which are performed concurrently upon the different bales in the respective press units. These operations are performed at "stations" and the turret is rotated in step-by-step fashion to bring each press unit into relation to the successive stations, each press unit being at a station when the turret is at rest. In the embodiment disclosed there are a preliminary compression and loading station, a high density baling station, two bale tying stations, a bale relieving station and a bale discharging station. Each press unit includes a press chamber which has an open lower end through which the bale is introduced and discharged and through which operates the plunger employed to effect the compression of the bale to high density.

*Preliminarily compressing the bale and loading a press chamber.*—The press is adapted to loose material or to material baled to light density by field presses. In either case it is preferable to provide for a preliminary compression which will reduce the volume of the hay by half and which will be exerted in a direction at right angles to the high density compression effected in the press chamber. The means for preliminarily compressing the material and the means for introducing the material into the press chamber are preferably in combined relation and of the structural form illustrated in Figures 1, 3, 7 and 8.

The material to be baled is initially deposited in a preliminary compression chamber 9 which is open at its top and includes a fixed end wall 10, fixed side walls 11 and a fixed bottom section 12. The chamber 9 is provided with a bottom opening 13 and the bottom, as normally constituted, is completed by a loading plunger 14 which occupies said opening. The chamber 9 is also provided with an end opening 15 which is normally occupied by a preliminary compression plunger 16, constituting a movable end wall and located opposite the fixed end wall 10. The chamber 9 is located in part under the table 6 but projects radially beyond said table (Figures 1 and 3) and the material to be baled is conveniently introduced into said chamber through the open upper end of its projecting portion, it being understood that the plungers 14 and 16 are in their retracted positions (Figure 7) and that the material is introduced in such quantity as to completely fill said chamber. The chamber 9 is preferably proportioned to receive two standard size field bales which are set on end, one resting on the plunger 14 and the other resting on the bottom section 12. The plunger 16 has a stroke equal to one-half of the length of the chamber 9 whereby, when fully projected (broken lines, Figure 7), said plunger will reduce the volume of said chamber by half and will occupy a position wherein it is flush with the adjacent wall of the opening 13 and immediately adjoins the plunger 14. In this way the material with which the chamber is charged will be preliminarily compressed to half of its original compass. Thus two field bales will be preliminarily compressed into the compass of a single bale.

The plunger 16, having completed its compression stroke, is held in its fully projected position during the operation of the plunger 14, the latter moving upward through the chamber 9 as delimited by the plunger 16 to a position slightly beyond the upper end of said chamber (Figure 3) and thereby carrying i. e. elevating the preliminarily compressed bale from the chamber 9 into the high density press chamber then located in alinement with the chamber 9.

The plungers 14 and 16 may be operated by any suitable means. As shown and preferred they are operated hydraulically and for this purpose are mounted upon rods 17 which, at their ends remote from said plungers, are provided with pistons 18 operating in cylinders 19. The cylinders 19 may be cast with the press chamber and, of course, stand at right angles to one another, their heads 20 through which the rods 17 work being suitably packed. The valve conections by which the fluid medium is admitted to the cylinders 19 may be of any suitable structure and arrangement and, embodying no new features and forming no parts of the invention, have not been shown, except for the nipples 21 by which the motive fluid is admitted into the cylinders.

*Baling to high density.*—The operation of compressing the bale to high density of course immediately succeeds the operation of loading the press chamber; and in the high density compressing operation various parts of the press chamber to be hereafter described are cooperating elements. For the present it is sufficient to point out that the active element for the high density compression is a plunger 22 (Figure 2) which operates vertically through the press chamber and is effective in cooperation with certain parts of said chamber to reduce the volume of the bale, as loaded therein, by substantially half. This will be apparent from a comparison of Figures 3 and 5, Figure 3 showing the bale as loaded into the press chamber and Figure 5 showing it upon the completion of the high density compression and in its final size. The bale in its final size, as shown in Figure 5, is substantially one-fourth of the volume of the material as introduced into the chamber 9 since the volume of such material is first reduced by half in the chamber 9 and, as thus reduced, is halved again in the press chamber.

The plunger 22 (Figures 4, 15 and 16), in order that it may match with certain of the press chamber parts, is formed along two of its opposite sides with recesses 23 which afford regularly spaced projections 24.

The plunger 22 may be operated by any suitable means but it is preferably operated by compressed air (Figures 2 and 4) and for this purpose the rod 25 by which said plunger is carried has at its lower end a suitably packed piston 26 operating in a cylinder 27 whose upper end is closed by a head 28 secured by screws or other fastenings 29 and whose lower end has a combined compressed air inlet and exhaust duct 30. The valved connections by which the compressed air is controlled, i. e. admitted to and vented from the cylinder 27, are not shown since they may be of any suitable and known construction and form no part of the invention.

The cylinder 27 is preferably cast integral with the base 1 from which it depends and to whose upper face it is open, the opening being closed by the head 28. Stated otherwise the base 1 is cast as a flange circumscribing the upper end of the cylinder 27 and the head 28, in so far as it may be used as a support for any of the parts employed, is functionally a part of said base.

*The press chamber.*—The table 6 is utilized as a part of the framing (Figures 1 and 2) of each press unit, such framing additionally including a stationary head 31 and posts 32 extending between and connecting said table and said head.

Each press unit also includes the press chamber proper whose walls are movably mounted, as will be hereafter described, and preferably a part which forms an extension of the press chamber at the lower end thereof and whose walls are fixed. The press chamber extension 33, as shown, is of rectangular box like form (Figures 11, 12 and 13), being open at its upper and lower ends and is arranged at the under side of the table 6 against which it is supported by prolongations of the posts 32 and nuts 34 on the lower terminals of said posts, the extension box 33 having at its upper end a circumscribing flange 35 which has an extensive flat and uniform bearing against the table 6 and is provided with corner openings 36 through which the posts 32 pass. The table 6 is provided with an opening 37 (Figure 1—section A—A of Figure 2) which conforms to the cross section of and registers with the upper end of the box 33 and whose walls are functionally parts of the walls of said box.

The box 33 maintains the preliminary compression of the bale and the opening delimited by its vertical walls of course conforms to the horizontal outline and dimensions of the bale. Said walls, however, preferably have their bale engaging faces slightly and regularly tapering toward their upper ends (Figures 12 and 13) in order that they may exert gradually increasing lateral compressive pressure upon the four vertical sides of the bale as it is moved through the box 33 by the plunger 22; and this tapering outline is also carried out with certain parts which are in operative association with the box 33, as will be hereafter described, and whose faces are parts of the bale engaging surfaces within said box. In this way the lateral preliminary compression of the bale is measurably and advantageously increased.

The structure includes means for the support of the bale which is operable to provide for its discharge from the press. Such means preferably comprises dogs 38 (Figures 2, 3 and 17-19) which are pivotally mounted at the lower end of the box 33, and project upward through said box into the press chamber proper. The dogs 38 are arranged in opposing groups (Figure 1, section B—B of Figure 2), preferably adjacent the inner and outer circumferences of the turret, and are mounted upon parallel rock shafts 39 for which the box 33 is provided with end bearings 40. As thus mounted the dogs have two positions, in one of which they are upright as shown in Figure 3 and in the other and normal of which they are inclined toward one another as shown in Figures 2 and 5. In order that their inward movement may be arrested and their innermost positions positively determined the dogs are provided above the table 6 with outwardly projecting arms 41 which terminate in hook-like lugs 42 for engagement with the inner and outer circumferential edges of the table 6. In order that the dogs may be of the same form at both sides of the box 33, thereby to avoid complication in manufacture and assemblage, the table 6 has along its inner edge recesses 43 which afford clearances for the lugs 42 of the adjacent group of dogs and whose bases are parallel to the outer edge portions of the table 6 with which they have common radial bisectors and are located at the same distance from the longitudinal centers of the respective boxes as the said outer edge portions with which they are parallel.

The bale-engaging surfaces of the box 33 at the sides thereof adjacent which the dogs 38 are mounted are, in part, afforded by inwardly projecting vertical ribs 44 which delimit vertical recesses 45 in which the dogs are arranged and have their movement. The dogs are pressed back into their upright or outer positions, as shown in Figure 3, by the adjacent upper edges of the bale very shortly after the upper end of the bale penetrates the lower end of the box 33 in connection with the loading of the press chamber; and when the dogs thus occupy their upright positions, their confronting vertical faces form parts of the adjacent bale-engaging surfaces of the box and are flush with the respective confronting vertical faces of the ribs 44, the bale-engaging surfaces which are thus provided by the dogs and the ribs being substantially continuous when the dogs are upright. The bale-engaging surfaces of the box are completed by the lower portions of the walls of the press chamber proper, as will be hereafter described and the box 33 is formed, internally, (Figures 11, 12 and 13) to accommodate said press chamber walls whereby their inner faces will be flush with the bale-engaging faces of the walls of the box and of the dogs 38. Thus the upper portions of the confronting faces of the ribs 44 are outwardly inclined as at 46 and the upper portions of the other two walls 47 are outwardly inclined as at 48.

The walls of the openings 37 of the table 1 are, as stated, functionally parts of the walls of the box 33 and accordingly the walls of said openings adjacent the inner and outer circumferences of the turret are formed with projections 49 and recesses 50 alining with and forming continuations of the respective ribs 44 and recesses 45, said projections having their confronting vertical faces inclined in conformity to the inclination 46 of the confronting faces of the ribs; and the other two walls of the opening 37 have their confronting faces 51 inclined conformably to the inclination 48 of the walls 47 of the box 33.

The projections 24 of the plunger 22 aline with the ribs 44 of the box 33 and the recesses 23 of said plunger aline with the recesses 45 of said box and afford accommodation for the dogs 38, enabling said dogs to move inward and under the bale as shown in Figure 4 when the plunger 22 has reached the limit of its upward stroke.

The upper faces of the dogs are arranged at such an angle, as at 52, (Figures 5 and 17–19) to the shanks or body portions of the dogs that they will occupy a common horizontal plane and hence afford uniform and stable support for the bale when the dogs are in their innermost positions. The inclined upper faces 52 also provide engaging points 53 which, by virtue of the normal tendency of the dogs to move inward, effectively bite into and therefore securely grip the bale and hold it against downward displacement during the interval between the loading of the press chamber, as effected by the plunger 14 and the high density compression of the bale as effected by the plunger 22.

The dogs are also formed in their upper faces 52 and for the full length thereof with slots 54 which are preferably of key-hole cross section and through which the wire bale ties are threaded when the press unit reaches one of the tying stations.

The press chamber proper consists of a top wall or platen 55 (Figures 2 and 22–24), two opposing vertical walls 56 (Figures 1, 2 and 27–30) and two other opposing vertical walls 57 (Figures 1, 2 and 31–33) located at right angles to the walls 56 and delimiting therewith a rectangular enclosure alining with and conforming to the enclosure provided by the box 33. The platen 55 and vertical walls 56 and 57 are in co-operation with the plunger 22 to effect the high density compression operation and are movably mounted whereby they may be displaced from their normal operative positions in order to gradually relieve the pressure on the densely compressed bale prior to its discharge. Accordingly and as preferred said platen and vertical walls are carried by a vertically movable head 58; the platen is rigidly secured against the under face of said head, preferably by means of a tang 59 projecting downward from the head and socketed in the platen and a set screw or other fastening 60 carried by the platen and engaging said tang; and the four vertical walls are movably connected to the head, preferably by knuckle pivots, as at 61, and are normally perpendicularly pendent from said pivots. When the head moves upward, as will be hereafter described, the platen, manifestly, moves away from the upper end of the bale and the four vertical walls move laterally outward, the pressure upon the upper end and the vertical sides of the bale being, in this way, relieved. It is preferred to provide for the positive operation of the four vertical walls whereby to space them from the bale as an incident of the discharging operation; and, for this purpose, said walls are provided at the upper side of their pivotal connections 61 with inwardly directed upwardly inclined fingers 62 which aline with and work in the recesses between the pivot knuckles of the head and, as the head 58 reaches the upward limit of its movement, engage the stationary press unit head 31 as a shoulder or abutment, such engagement being effective to positively move the walls 56—57 to their extreme outward positions.

The inner faces of the walls 56—57 are vertically continuous but their outer faces have their lower portions formed on downward and inward inclinations 63 and 64 respectively, conforming to the respective inclinations 46 of the extension-box ribs 44 and 48 of the extension-box walls 47. The lower portions of the walls 56 and 57 project into the upper end of the box 33 and said walls, in their normal positions and by virtue of the inclinations 46—63 and 48—64, have their inner faces flush and vertically continuous with the bale-engaging faces (preferably upwardly tapering) of the said ribs 44 and walls 47.

The walls 56, which are disposed adjacent the inner and outer circumferences of the turret, have a grid-like form and include a plurality of vertical parallel members whose lower portions 65 aline with and conform to the ribs 44 and delimit recesses 66 which aline with and conform to the recesses 45 and whose upper portions 67 are of greater width and delimit relatively narrow slits 68 which are preferably bell-mouthed, as at 69, along the outer faces of said walls. The recesses 66 afford accommodation for the portions of the dogs 38 which project upward beyond the bale-engaging faces of the extension box and, forming substantial continuations of the recesses 45, aline with the recesses 23 of the plunger 22; and the parts 65, which form substantial continuations of the ribs 44, of course aline with the projections 24 of said plunger. The slits 68 with their bell mouths 69 provide guides for the wires used in tying the bale and by reason of their length and form facilitate the handling and manipulation of these wires.

The platen 55 has its working (under) face provided with slots 70 which extend between the walls 56 and aline with the slits 68. The slots 70 are guides for the tie wires and preferably have a key-hole cross section similarly to the slots 54 (with which they correspond in function) of the dogs 38.

*Tying, relieving and discharging the bale.*—After the bale has been compressed to high density by the cooperative action of the plunger 22, the platen 55 and the press chamber walls 56—57 as shown in Figure 4, the plunger 22 is retracted but the support and high density compression of the bale is continued by the dogs 38 throughout the tying operations which, in the machine disclosed, are performed at the two stations succeeding the high density compression station. The bale is tied by operatives with wire strands in the usual or any suitable manner, the strands, of which any desired number may be employed, being threaded or manipulated through the slots 54 and 70 of the dogs 38 and platen 55 and the slits 68 of the walls 56 and tightened about the bale, their ends being then suitably secured together.

Upon the release of the compression pressure exercised by the press chamber parts the bale tends to re-expand, but this tendency is largely counteracted by the tie wires. However if the re-expansion tendency develop suddenly or violently there is serious liability of the tie wires being snapped or stretched beyond the elastic limit and to prevent this effect I have provided for the very gradual relief of the pressure upon all sides of the bale prior to its discharge from the press, this "relieving" operation being performed at a station intermediate the last tying station and the final station of the machine whereat the bale is discharged.

During the high density compression operation the head 58 is held with substantial rigidity in its lowermost position and thereby the platen 55 and the walls 56 and 57 are rigidly maintained in their operative positions. But for the gradual relief of the compression pressure (Figure 5) the head and platen are permitted to rise under the re-expansion tendency of the bale and as the head thus moves upward it raises the walls 56 and 57 and the re-expansion of the bale at its sides moves the said walls outward, as shown in Figure 5, it being understood that the raising of the walls 56 and 57 provides for a measure of outward swinging movement of said walls which is limited by the engagement of their lower ends with the walls of the extension box 33.

For the control of the head 58 in the above stated functions and operations it is preferred to employ an oil chamber and piston in association with said head and the stationary press unit head 31. The press unit head has incorporated therewith (Figures 4, 5, 25 and 26) a cylinder 71 whose upper end is closed by a head 72 and whose lower end is open. To facilitate manufacture the cylinder 71 is preferably made as a separate part and is permanently fitted within the head 31 with which it has an air and liquid tight jointure. The cylinder 71 provides an oil chamber and the head 58 carries an upright plunger 73 which projects into said cylinder, the joint being maintained oil tight by suitable packing 74. The head 31 (Figures 4, 34 and 35) is formed, preferably in circumscribing relation to the cylinder 71, with an oil reservoir 75 closed by a cover plate 76 suitably secured to said head; and the chamber provided by the cylinder 71 has communication with said reservoir by an inlet duct 77 and an outlet duct 78. The duct 77 is controlled by a suitable check valve 79 whereby the oil may not be forced back from the cylinder 71 to the reservoir 75 but may freely pass from said reservoir to said cylinder; and the duct 78 is controlled by a suitable manually operated valve 80 (preferably of the screw stem type) which may be opened to any desired degree to regulate the flow of the oil from the cylinder 71 to the reservoir 75.

During the high density compression operation the valve 80 is fully closed and the oil is confined in the cylinder 71, its escape being prevented by the check valve 79. The oil in the cylinder 71 functions as a rigid abutment for the plunger 73 whereby the head 58 is rigidly held in its lowermost position and the platen 55 and walls 56 and 57 are rigidly maintained in their operative positions. It will be obvious that the opening of the valve 80 provides for the escape of oil from the cylinder 71 to the reservoir 75 and that the plunger 73 in response to the upward pressure exercised by the densely compressed bale on the platen 55 will, when the valve 80 is opened, move into the cylinder 71 and force the oil from said cylinder through the duct 78 into the reservoir 75. Consequently when the compression pressure is to be relieved the valve 80 is manipulated and, by opening said valve to a greater or less degree, the gradual relief of the compression pressure may be absolutely controlled and regulated, i. e. accelerated or retarded as desired.

It is preferred to interpose between the plunger 73 and the cylinder head 72 an expansive helical spring 81 which will incidentally retard the upward movement of the head 58 and thereby insure the gradual relief of the compression pressure in case the valve 80 should, by carelessness or negligence, be opened too suddenly and widely but whose principal function is to assist the return of said head to its normal position. This is effected, as will be hereafter described, subsequent to the bale discharging operation during which the valve 80 is left open and is preferably fully opened.

After the compression pressure has been relieved the press unit is moved to the bale discharging station where the dogs 38 are operated to release the bale and permit its discharge by gravity (Figure 6), the released bale dropping from the press through the lower end of the box 33. In connection with the releasing operation of the dogs 38 it is preferred to provide for further outward movements of the press chamber walls 56 and 57. Accordingly the mechanism by which the dogs 38 are controlled and operated is preferably correlated to the press chamber head 58 in such manner (1) that it will effect a further upward movement of said head, (2) that it will act in conjunction with the oil and the spring 81 in the cylinder 71 in retarding the upward movement of said head and the consequent outward movement of the walls 56 and 57 during the bale relieving operation above described, and (3) that it will prevent an operation of the dogs to release the bale except when the pressure on the bale has been relieved.

The mechanism for operating the dogs 38 to release the bale is preferably operated by compressed air and has, as its operating part, an air driven element 82 (Figure 2) which is formed as a cylindrical cap and has a very close sliding fit on the cylinder 71. The press unit head 31 has an air duct 83 which is continued vertically through the cylinder 71 and opens to the upper face thereof. The air admitted through the duct 83 reacts against the head 72 and raises the cap cylinder 82.

The compressed air for the operation of the cap 82 is supplied from a suitable storage reservoir (not shown) which is connected by a pipe 84 (Figure 2) to a duct 85 formed axially in the tension rod $3^a$ and, as shown, extending from the upper end thereof. The duct 85 at its lower end has one or more radial branches opening to a distributing chamber 86 fitted with air tight jointure upon the rod $3^a$ and connected by radial pipes 87 to the ducts 83 of the respective press units. The pipes 87 are provided with manually operated controlling valves 88 of suitable and well known structure which may be operated to pass air to the ducts 83 for the operation of the cap 82 and to vent the air to the atmosphere after the cap has been operated, thereby to provide for the return of the cap to its normal position wherein it rests upon the head 31.

The cap 82 has an external annular shoulder 89 (Figures 4 and 40) which affords a seating for a ring 90 (Figures 1, 4, 36 and 37) having a slidable fit on said cap and provided with oppositely located, outwardly projecting, radial arms 91. The rock shafts 39 which carry the dogs 38 are provided, externally of the box 33 and at both ends, with crank arms 92, those of one rock shaft projecting toward those of the other. The crank arms 92 are resiliently or elastically connected to the arms 91 of the ring 90, the connections (Figures 3, 5, 38 and 39) comprising a stem 93 rigidly secured to and pendent from each arm 91, a sleeve 94 enclosing the lower end of said stem and slidably mounted thereon and toggle links 95 between the lower end of the sleeve 94 and the pair of crank arms 92 at the same side of the press unit, the table 6 (Figure 1) having slots 96 through which the links 95 project. The stem 93 terminates at its lower end in a head 97 which affords bearings for two expansive helical springs, the upper one 98 bearing against the flange 99 at the upper end of the sleeve 94 and the lower one 100 bearing against the bottom head 101 of said sleeve. Above the head 97 the stem is formed with an annular shoulder 102 which, at times, engages the flange 99 as will be hereafter described.

In order to correlate the operating mechanism for the dogs 38 to the press chamber head 58 the stems 93 are rigidly connected to said head. For this purpose the head 58 is provided (Figures 2, 20 and 21) with outwardly projecting arms 103 having openings through which the stems 93 are fitted; and said stems are formed below the arms 103 with annular shoulders 104 and above said arms carry nuts 105 by which the arms 103 are clamped against the shoulders 104. In the normal positions of the parts (Figure 2) the arms 103 are suitably spaced above the upper end of the sleeves 94 whereby said sleeves may have upward play on the stems 93.

The dogs 38 tend to move into their inner and normal positions by gravity but they are also urged into such positions by the springs 100. Thus during the loading of the press chamber, the bale in its upward movement through the box 33 presses the dogs outward but such outward movement of the dogs is resisted by the springs 100 which, as soon as the bale has passed upward beyond the dogs, are effective to quickly move, i. e. snap, the dogs into their inner position to provide support for the bale as shown in Figure 5.

When the press chamber head 58 moves upward during the operation of relieving the compression pressure on the bale it carries with it the stems 93 but the upward movement of the head is then opposed by the springs 98 which are compressed between the heads 97 of the stems 93 and the flanges 99 of the sleeves 94, the latter being held stationary by the dogs 38 whose movement is prevented by the weight of the bale resting thereon. The springs 98 thus, incidentally, provide further or cumulative means for insuring of the gradual relief of the pressure on the bale.

The ring 90 slides upward on the cap 82 during the relief of the compression pressure but during the operation of releasing the bale it is engaged and raised by the cap. For this operation the valve 88 is manipulated to admit compressed air under the cap which then moves upward and shortly after its movement commences engages the ring 90 which is thereafter raised. By means of the ring 90 the cap is operatively coupled to the stems 93 which, as the ring is raised by the cap, are effective to lift the sleeves 94 and, through the toggle links 95 and crank arms 92 to move the dogs 38 outward from under the bale.

In lifting the sleeves 94 the stems at first act through the springs 98 which function as resilient cushions and prevent the development of sudden shocks. Subsequently, and as the compression of the springs 98 may permit, the shoulders 102 of the stems 93 come into engagement with the flanges 99 of the sleeves 94 and thereupon the lifting of said sleeves by said stems is effected positively. As the stems 93 are raised, in the manner just described, by the cap 82 they are also effective to lift the press chamber head 58, the oil escape valve 80 having been left open as previously explained. This lifting of the press chamber head obviously increases the amplitude of outward movement of the press chamber walls 56 and 57 and is effective to positively space said walls from the bale owing to the engagement of the fingers 62 of said walls against the stationary press unit head 31.

The upward movement of the cap 82 is limited by the engagement of the press chamber head 58 against the press unit head 31 and at the time such engagement occurs the walls 56 and 57 will be fully and positively spaced from the bale and the dogs 38 will be fully and positively withdrawn from under the bale, the latter thereupon dropping through the press chamber and its extension box 33.

When the bale has thus been released and discharged the parts are reset by first venting the compressed air from the cap 82 by appropriate manipulation of the valve 88 and then closing the valve 80. When the valves 88 and 80 are thus operated the press chamber head 58 returns by gravity, aided by the spring 81, to its normal position and in its downward movement it draws the oil charge from the reservior 75 through the inlet duct 77 into the cylinder 71, the escape of the oil from said cylinder being prevented by the check valve 79. As the head 58 descends it also carries with it the stems 93 which, through the ring 90, positively effect the return of the cap 82. The sleeves 94 of course follow the stems 93 and the dogs 38 resume their normal position by gravity. The press chamber is then ready to receive another preliminarily compressed bale and for such purpose is moved to the loading station whence it started.

The connection of the stems 93 to the head 58, aside from providing for the operation of said head by the cap 82 and the return of the parts to their normal positions consequent to the downward movement of said head, also insures that the dogs 38 may not be operated to release the bale until after the valve 80 has been operated to permit the upward movement of the head 58, thereby making it compulsory to gradually relieve the compression pressure on the bale prior to its discharge from the press. This is for the reason, as will be obvious, that the head 58 is held rigidly in its normal position so long as the valve 80 is closed and, as thus held rigid, will prevent an upward movement of the cap 82, the stems 93 functioning as ties; wherefore the cap 82 may be operated only as the head 58 is permitted to rise by the operation of its controlling means, specifically the valve 80.

*Turret operation.*—The turret is preferably gear-driven in its step-by-step operation whereby to move the press units to the successive stations at which the various operations are performed, the gearing being under the control of a device which is normally effective to prevent the rotation of the turret and which is automatically operative to limit such rotation to a step whose extent is determined by the number of stations. In the embodiment disclosed this step comprises one-sixth of a revolution.

The gearing is preferably of the construction disclosed according to which the turret base 4 is utilized as a gear wheel and is provided with marginal spur teeth 106 (Figures 2, 51 and 52), these being in mesh with an intermittently operated pinion 107 (Figures 49, 51 and 52) which, in operation, rotates but a single revolution during which it moves the base 4 through one step, i. e. one-sixth of a revolution.

For the operation of the pinion 107 there is provided an upright clutch shaft 108 (Figures 42, 49 and 52) which has a bearing 109 in the base 1 and is continuously driven by suitable gearing (not shown) preferably located below said base. Above the base 1 the shaft 108 is provided with a continuous annular flange 110 (Figures 41, 42 and 49) and above said flange with a reduced clutch disc 111 having a radial elongated recess 112 extending to its margin. Beyond the disc 111 the shaft has an extension 113 which forms a journal for the pinion 107. The pinion 107 is combined with a clutch element 114 (Figures 43, 44, 45, 49 and 52) whose diameter is equal to that of the flange 110 and which rests upon the disc 111. The clutch element 114 has its body part integral with the pinion 107 and is completed by a ring fitted peripherally on said body part. The extension 113 projects beyond the pinion 107 and its upper end is fitted in a bearing 115 (Figures 51–52) suitably fastened to the base 1, said bearing having in its under side an angular recess 116 to afford accommodation for the flange 110, the clutch member 114 and the pinion 107.

The flange 110 and clutch member 114 delimit an annular recess 117 for which the disc 111 provides a base and to which the recess 112 extends. The clutch member 114 is provided with an elongated radial recess 118 which conforms to and, at times, registers with the recess 112 but is of greater length. The recess 118 extends from a vertical bore 119 which is closed at its upper end. The pinion 107 is operatively coupled to the disc 111 by a clutch pin 120 (Figures 46–49) having a cylindrical shank 121 and a radial shoe 122 whose under face has a cam formation as at 123. The shank 121 works in the bore 119 and the shoe 122 works in the recesses 118—112 to which it conforms. The clutch pin 120 is pressed downward by an expansion helical spring 124 socketed therein and bearing against the end closure of the bore 119.

When the shoe 122 occupies both of the recesses 118 and 112 the pinion 107 is thereby connected to the clutch disc 111 and is driven from the shaft 108.

Normally, however, the shoe 122 is confined in the upper recess 118 and the disc 111 rotates free of the pinion 107 which of course remains stationary; and when the shoe is permitted to engage in the recess 112 it is automatically disengaged from said recess as soon as the pinion 107 has completed a single revolution. For the control of the shoe 122 a horizontal lever 126 (Figures 50, 51 and 52) is employed, said lever being pivoted at 127, preferably on the head 28 of the cylinder 27, and having an angularly disposed hand grip 128. The working terminal 129 of the lever operates in the recess 117 and in a mating recess formed in the bearing 115 and is formed to engage the cam 123 of the shoe 122 in order to hold said shoe beyond the recess 112. The lever is normally acted on by a spring 131 housed in the bearing 115. The said terminal 129 normally rides upon the edge of the disc 111 (forming the base of the recess 117) but when the recess 112 comes into alinement with the shoe 122 the spring 131 snaps the terminal slightly into the recess 112 wherein it is effective to prevent said shoe from entering said recess. As the rotation of the disc 111 continues the "far" corner of the recess 112 will displace the terminal 129 from said recess. When the pinion 107 is to be rotated the lever 126 is manipulated to hold the terminal 129 beyond the recess 112 at the time the latter comes into alinement with the shoe 122 whereupon said shoe is pressed by its spring 124 into said recess and the pinion 107 then rotates with the disc 111. As soon as the rotation of the pinion 107 commences the lever 126 is released and the spring acts on said lever as before, forcing its terminal into the recess 112 as the pinion 107 completes its revolution. The terminal 129, acting on the cam 123, is then effective to raise the shoe 122 beyond the recess 112 whereupon the disc 111 runs free of the pinion.

*Résumé of operation.*—The six stations are shown in Figure 1 as follows: A, preliminary compression and loading; B, high density compression; C, D, tying; E, relief of compression pressure; and F, bale discharging. Each step of rotation of the turret, as effected by the pinion 107, brings a press unit to one of the stations and in each revolution of the turret, one of the press units will have been brought to all of the stations. Hence when the turret is at rest its six press units are located at the respective stations and the sequential operations necessary for each bale are concurrently performed. At station A the bale is preliminarily compressed by the plunger 16 and, as thus compressed, loaded into the press chamber of the adjacent unit by the plunger 14; during its movement from station A to B the bale is supported by the dogs 38 whose points 53 bite into or grip its opposite sides; at station B the bale is densely compressed within the press chamber of the adjacent unit by the plunger 22 in co-operation with the platen 55 and press chamber walls 56 and 57; at stations C and D the densely compressed bale rests upon the faces 52 of the dogs 38 by which it is supported from below and is tied by the operatives, the wires being threaded through the slots 54 and 70 of the plunger 22 and platen 55 and through the slits 68 of the press chamber walls 56; at station E the compression pressure on the bale is gradually relieved by permitting the escape of the oil abutment by which the press chamber head 58 is normally backed whereby the platen 55 moves upward and the walls 56—57, as elevated by the head 58, swing outward, all in response to the reexpansion tendency of the bale; and at station F the dogs 38 are withdrawn from under the bale by the upward movement of the cap 82 consequent to compressed air being delivered under said cap at which time the bale drops from the press through the open extension box 33 and after the bale has been thus discharged the parts are reset by the downward movement of the head 58, such movement being permitted by the venting of the compressed air from within the cap.

The embodiment of the invention herein disclosed is preferred, as now considered. The invention is, however, believed to be of considerable novelty within its particular field and it will therefore be understood that no specific description herein contained is intended to impose any limitation upon the scope of the appended claims not inherent in the language thereof or to be taken otherwise than for necessary purposes of exposition.

The operations described herein are related, in certain of their aspects, to the method of baling fibrous material which forms the subject of my co-pending application Serial No. 322,919 filed Sept. 10, 1919, and the machine herein disclosed is advantageously adapted to the practice of said method.

Having fully described my invention, I claim:—

1. In a baling press, the combination with a press chamber of a second chamber adapted for end-wise communication with said press chamber and to receive initially the charge of material to be compressed in said press chamber, means movable at a right angle to the endwise direction of communication of said second chamber and said press chamber for preliminarily compressing the material in said second chamber, and means movable in the endwise direction of communication of said second chamber and said press chamber for transferring the preliminarily compressed material from said second chamber to said press chamber.

2. In a baling press, the combination with a press chamber, a second chamber to receive initially the charge of material to be compressed in said press chamber, means for preliminarily compressing the material in said second chamber, means for transferring the preliminarily compressed material from said second chamber to said press chamber and means operating within said press chamber for compressing the preliminarily compressed charge to high density.

3. In a baling press, the combination with a press chamber, a second chamber to receive initially the charge of material to be compressed in said press chamber, means for preliminarily compressing the material in said second chamber, means for transferring the preliminarily compressed material from said second chamber to said press chamber, means operating within said press chamber for compressing the preliminarily compressed charge to high density and yieldable means, automatically operative, for supporting the charge both as preliminarily compressed, by engagement with the sides thereof, and, as densely compressed, by engagement with the bottom thereof.

4. In a baling press, the combination with a press chamber, of a second chamber adapted for endwise communication with said press chamber and to receive initially the charge of material to be compressed in said press chamber, means movable at a right angle to the endwise direction of communication of said second chamber and said press chamber for preliminarily compressing the material in said second chamber, means movable in the endwise direction of communication of said second chamber and said press chamber for transferring the preliminarily compressed material from said second chamber to said press chamber, and other means also movable in the endwise direction of communication of said second chamber and said press chamber and operating within said press chamber for compressing the preliminarily compressed charge to high density.

5. In a baling press, the combination with a press chamber, of a second chamber adapted for endwise communication with said press chamber and to receive initially the charge of material to be compressed in said press chamber, means movable at a right angle to the endwise direction of communication of said second chamber and said press chamber for preliminarily compressing the material in said second chamber, means movable in the endwise direction of communication of said second chamber and said press chamber for transferring the preliminarily compressed material from said second chamber to said press chamber, other means also movable in the endwise direction of communication of said second chamber and said press chamber for compressing the preliminarily compressed charge to high density, and yieldable means, automatically operative, for supporting the charge both as preliminarily compressed, by engagement with the sides thereof, and, as densely compressed, by engagement with the bottom thereof.

6. In a baling press, the combination with a press chamber having an open end, of a second chamber having an open end to aline with the open end of the press chamber, said second chamber serving to receive initially the charge of material to be compressed in said press chamber, a plunger constituting a movable wall of said second chamber and operable to preliminarily compress the charge of material and a second plunger movable at a right angle to said first plunger and in the direction of communication of said second chamber and said press chamber, said second plunger being operable to transfer the preliminarily compressed charge from said second chamber to said press chamber.

7. In a baling press, the combination with a press chamber open at its lower end of a second chamber open at its upper end and arranged below said press chamber whereby said open ends may be alined, said second chamber serving to receive initially the charge of material to be compressed in said press chamber, a vertical plunger forming a movable wall of said second chamber and operable, by movement along the bottom thereof, to preliminarily compress the charge of material, and a horizontal plunger normally forming a part of the bottom of said second chamber and operable by movement along said first plunger to transfer the preliminarily compressed charge from the second chamber to the press chamber.

8. In a baling press, the combination of a charge receiving chamber, a press chamber movable relatively thereto, means for preliminarily compressing the charge in said receiving chamber, means for transferring the preliminarily compressed charge directly from said receiving chamber to said press chamber at a period of the movement of the latter and means operable at a later period of the movement of said press chamber and in a direction at a right angle to said preliminary compressing means for compressing the charge to high density within said press chamber.

9. In a baling press, in combination, a press chamber open at its lower end, means operating to pass a charge of material into the press chamber through its open lower end, mechanism spaced from said means adapted to operate through said open lower end to compress the charge in said press chamber, means for conveying the press chamber to a position in alignment with said mechanism, and means acting automatically for supporting the charge both prior and subsequent to its compression.

10. In a baling press, in combination, a press chamber open at its lower end, means operating to pass a charge of material into the press chamber through its open lower end, other means operating through said open lower end to compress the charge in said press chamber, means acting automatically for supporting the charge, prior to compression, by engagement with its sides and, after compression, by engagement under its bottom, and means for withdrawing said supporting means from under the bottom of the compressed charge, thereby to permit said charge to drop by gravity through the open lower end of the press chamber.

11. In a baling press, in combination, a press chamber having at its lower end an open-ended extension box of fixed form, said chamber having movably mounted walls above said extension box, and means to hold said movably mounted walls normally rigid whereby they delimit an enclosure conforming to and forming an immediate continuation of the extension box, said means being operable to provide for the outward movement of said walls.

12. In a baling press, in combination, a press chamber having at its lower end an open-ended extension box of fixed form, said chamber having movably mounted walls above said extension box, means to hold said movably mounted walls normally rigid wherein they delimit an enclosure conforming to and forming an immediate continuation of the extension box, said means being operable to provide for the outward movement of said walls and means for passing a charge of material through said extension box and into said press chamber, said extension box and press chamber, in the normal positions of said movable walls, being formed to exert gradually increasing lateral pressure upon the charge of material during its movement by said last named means.

13. In a baling press, in combination, a press chamber open at its lower end and having two of its opposed walls formed with vertical inwardly projecting ribs delimiting vertical recesses and groups of vertically disposed dogs associated with said respective walls and movably mounted in said recesses, said dogs being movable inward to project beyond said ribs and in their outermost positions having their confronting faces flush with the corresponding faces of the adjacent ribs.

14. In a baling press, in combination, a press chamber having at its lower end an open-ended extension box of fixed form, said extension box having two of its opposed walls formed with vertical inwardly projecting ribs delimiting vertical recesses, and groups of vertically disposed dogs associated with said respective walls and pivotally mounted at their lower ends in said recesses, said dogs being movable inward to project beyond said ribs and in their outermost positions having their confronting faces flush with the corresponding faces of the adjacent ribs.

15. In a baling press, in combination, a press chamber having at its lower end an open-ended extension box of fixed form, said extension box having two of its opposed walls formed with vertical inwardly projecting ribs delimiting vertical recesses, said press chamber above said extension box being provided with recesses vertically alining with said vertical recesses, and groups of vertically disposed dogs associated with said respective walls and movably mounted in said vertical recesses, said dogs being movable inward to project beyond said ribs and in their outermost positions having their confronting faces flush with the corresponding faces of the adjacent ribs, said dogs being provided with extensions which project through the recesses of said press chamber and formed with hook shaped lugs adapted to engage the upper edges of the extension box and thereby limit the inward movement of the dogs.

16. In a baling press, in combination, a press chamber open at its lower end and having two of its opposed walls formed with vertical inwardly projecting ribs delimiting vertical recesses, groups of vertically disposed dogs associated with said respective walls and movably mounted in said recesses, said dogs being movable inward to project beyond said ribs and in their outermost positions having their confronting faces flush with the corresponding faces of said ribs and a compression plunger operating vertically through the open lower end of said press chamber and having along two opposite sides projections which aline with said ribs and recesses which aline with said recesses first named and afford accommodation for said dogs when they project inward beyond said ribs.

17. In a baling press, in combination, a press chamber, dogs arranged at opposite sides of said chamber and automatically movable to normal positions wherein they may support the charge of material in said chamber and means common to all of said dogs for effecting their movement to positions in which they are withdrawn from supporting engagement with said charge of material, said dogs being yieldable from their normal positions independently of said means.

18. In a baling press, in combination, a press chamber, dogs arranged at opposite sides of said press chamber and automatically movable to normal positions wherein they may support the charge of material in said chamber, and means common to all of said dogs for effecting their movement to positions in which they are withdrawn from supporting engagement with said charge of material, said means including resilient connections for relieving its operation of shocks.

19. In a baling press, in combination, a press chamber, dogs arranged at opposite sides of said chamber and automatically movable to normal positions wherein they may support the charge of material in said chamber and means common to all of said dogs for effecting their movement to positions in which they are withdrawn from supporting engagement with said charge of material, said dogs being yieldable from their normal positions independently of said means and said means having resilient elements incorporated therewith for resisting the independent yielding movements of said dogs.

20. In a baling press, in combination, a press chamber, dogs arranged at opposite sides of said press chamber and automatically movable to normal positions wherein they may support the charge of material in said chamber and means common to all of said dogs for effecting their movement to positions in which they are withdrawn from supporting engagement with said charge of material, said dogs being yieldable from their normal positions independently of said means and said means having resilient elements incorporated therewith for resisting the independent yielding movements of said dogs, said means also including resilient connections for relieving its operation of shocks.

21. In a baling press, in combination, a press chamber, dogs arranged at opposite sides thereof and automatically movable to normal positions wherein they may support the charge of material in said chamber, rock shafts controlling the movements of said dogs and having crank arms at their ends, and means for moving said dogs to positions in which they are withdrawn from engagement with said charge of material, said means including an actuating element movable in the direction of the axis of said press chamber and yielding linkage connections between said actuating element and said crank arms.

22. In a baling press, in combination, a press chamber, dogs arranged at opposite sides thereof and automatically movable to normal positions wherein they may support the charge of material in said chamber, rock shafts controlling the movements of said dogs and means for moving said dogs to positions in which they are withdrawn from engagement with said charge of material, said means including a fluid driven actuating element and connections between said element and said rock shafts.

23. In a baling press, in combination, a press chamber, dogs arranged at opposite sides thereof and automatically movable to normal positions wherein they may support the charge of material in said chamber, rock shafts controlling the movements of said dogs and having crank arms at their ends, and means for moving said dogs to positions in which they are withdrawn from engagement with said charge of material, said means including an actuating element movable in the direction of the axis of said press chamber and linkage connections between said actuating element and said crank arms, said linkage connections having elements incorporated therewith for relieving shocks in the operation of said dogs by said means.

24. In a baling press, in combination, a press chamber, dogs arranged at opposite sides thereof and automatically movable to normal positions wherein they may support the charge of material in said chamber, rock shafts controlling the movements of said dogs and having crank arms at their ends, and means for moving said dogs to positions in which they are withdrawn from engagement with said charge of material, said means including an actuating element arranged above, and movable in the direction of the axis of said press chamber, stems pendent from said actuating element at opposite sides of said press chamber, a sleeve slidably fitted upon each stem, toggle links connecting the lower end of each sleeve and the respective crank arms adjacent the same side of the press chamber and connections between said stems and said sleeves whereby the stems in their upward movement with said actuating element will raise said sleeves.

25. In a baling press, in combination, a press chamber, dogs arranged at opposite sides thereof and automatically movable to positions wherein they may support the charge of material in said chamber, rock shafts controlling the movements of said dogs and having crank arms at their ends and means for moving said dogs to positions in which they are withdrawn from engagement with said charge of material, said means including an actuating element arranged above, and movable in the direction of the axis of, said press chamber, stems pendent from said actuating element at opposite sides of said press chamber, a sleeve slidably fitted upon each stem and enclosing the lower end thereof, each stem having a head at its lower end, expansion springs confined in said sleeve above and below said head and toggle links connecting the lower end of each sleeve and the respective crank arms adjacent the same side of the press chamber.

26. In a baling press, in combination, a press chamber having a movable head, and walls delimiting an enclosure, said walls being movable outward and inward in directions at angles to the direction of movement of said head and having their movements controlled by said head, means for holding said head in a normal position and operable to permit an outward movement thereof, said head in its outward movement providing for the outward movement of said walls.

27. In a baling press, in combination, a press chamber having a vertically movable head and walls pivoted to and pendent from said head and means for holding said head normally in its lowermost position and operable to permit an upward movement thereof, said head in its upward movement providing for the outward movement of said walls.

28. In a baling press, in combination, a press unit having a stationary head and a press chamber arranged below said head, said press chamber having a vertically movable head adjoining said press unit head and walls pivoted to and pendent from said vertically movable head, said walls having angularly disposed fingers above their pivots adapted to engage said press unit head and means for holding said press chamber head normally in its lowermost position and operable to permit an upward movement thereof, said press chamber head in its upward movement causing the engagement of said fingers with said press unit head whereby to effect outward movement of said walls.

29. In a baling press, in combination, a press chamber having a vertically movable head, walls pivoted to and pendent from said head and an open-ended extension box of fixed form into which said walls project at their lower ends, and means for holding said head normally in its lowermost position and operable to permit an upward movement thereof, said extension box confining said walls against outward movement in the lowermost position of said head and said head in its upward movement providing for outward movement of said walls.

30. In a baling press, in combination, a press chamber having a vertically movable head, walls pivoted to and pendent from said head and an open-ended extension box of fixed form into which said walls project at their lower ends, and means for holding said head normally in its lowermost position and operable to permit an upward movement thereof, said extension box having outwardly inclined seats for the portions of said walls projecting therein and confining said walls against outward movement in the lowermost position of said head.

31. In a baling press, in combination, a press chamber having walls movable outward relative to one another, an extension box by which said walls are normally confined against outward movement, a head movable to provide for the outward movement of said walls and means for holding said head in a normal position.

32. In a baling press, in combination, a press chamber having an endwise movable head and means for holding said head in a normal position and for permitting an outward movement thereof comprising a fixed cylinder mounted co-axially with said head, the latter having a plunger operating in said cylinder, an oil reservoir having inlet and outlet connections with said cylinder and an adjustable valve controlling the outlet connection.

33. In a baling press, in combination, an expansible press chamber having an endwise movable head, means whereby said press chamber is held constricted in the normal position of said head and means for holding said head in its normal position and for permitting an outward movement thereof comprising a fixed cylinder mounted coaxially with said head, the latter having a plunger operating in said cylinder, an oil reservoir having inlet and outlet connections with said cylinder and an adjustable valve controlling the outlet connection.

34. In a baling press, in combination, a press chamber having an endwise movable head, a plunger adapted to reciprocate in said chamber, a liquid fluid abutment to hold said head in a normal position and including a fluid containing cylinder having a liquid outlet and an adjustable valve normally closing said outlet and capable of regulating the flow of liquid from said cylinder.

35. In a baling press, in combination, a press chamber having an endwise movable head, a plunger adapted to reciprocate in said chamber, and means for holding said head in a normal position and for permitting an outward movement thereof comprising a fixed head having a cylinder incorporated therewith, an oil reservoir surrounding the cylinder, inlet and outlet ducts between the reservoir and cylinder, the inlet duct having a check valve and an adjustable valve controlling and normally closing the outlet duct, the movable head having a plunger operating in said cylinder.

36. In a baling press, in combination, a press chamber having a movable head and movable walls, means automatically operable in said chamber to support the bale compressed therein and means for holding said head and walls in a normal position and operable to permit and control their outward movement in response to the re-expansion tendency of the bale, thereby to relieve gradually the compression pressure on the bale, the said supporting means being operable throughout the said outward movement of the head and walls.

37. In a baling press, in combination, a press chamber having a movable head, means for holding said head in a normal position and operable to permit and control its outward movement in response to the re-expansion tendency of the bale, thereby to relieve gradually the compression pressure on the bale, and means automatically operable to support the bale compressed in said press chamber prior to and during the said outward movement of the head.

38. In a baling press, in combination, an expansible press chamber having automatically operable means for the support of the bale compressed therein and means for holding the press chamber normally constricted and operable to permit and control its expansion in response to the re-expansion tendency of the bale, thereby to relieve gradually the compression pressure on the bale, the said supporting means being operable throughout the said expansion of the press chamber.

39. In a baling press, in combination, an expansible press chamber having automatically operable means for the support of the bale compressed therein, means for holding the press chamber normally constricted and operable to permit and control its expansion in response to the re-expansion tendency of the bale, thereby to relieve gradually the compression pressure on the bale, the said supporting means being operable throughout the said expansion of the press chamber, means for operating the said supporting means to release the bale and means whereby the supporting means may not be operated to release the bale until after the operation of the means first named to provide for the expansion of the press chamber.

40. In a baling press, in combination, a press unit having a press chamber and a stationary head beyond said press chamber, means associated with said press chamber and automatically operable to support the bale compressed therein and fluid driven means associated with said head for operating said supporting means to release the bale.

41. In a baling press, in combination, a press unit having a press chamber and a stationary head above said press chamber, groups of dogs arranged within said press chamber at opposite sides thereof and automatically operable to support the bale compressed therein, a fluid driven element associated with said head and operative connections between said element and said dogs whereby said element may be actuated to withdraw the dogs from supporting engagement with the bale.

42. In a baling press, in combination, a press unit having a press chamber and a stationary head above the press chamber, the press chamber having a head arranged under and movable toward and from the stationary head, means associated with said press chamber and automatically operable to support the bale compressed therein, fluid driven means associated with said stationary head for operating said supporting means to release the bale and a fluid abutment means also associated with said stationary head for holding the press chamber head normally in its lowermost position, said fluid abutment means having a fluid escape valve for permitting and controlling the upward movement of said movable head.

43. In a baling press, in combination, a press chamber having automatically operable means for the support of the bale compressed therein, means for holding the press chamber normally constricted and operable to permit and control its expansion in response to the re-expansion tendency of the bale, thereby to relieve gradually the compression pressure on the bale, the said supporting means being operable throughout the said expansion of the press chamber, means for operating the said supporting means to release the bale and means of connection between the last named means and the press chamber whereby said last named means also provided for a further expansion of the press chamber beyond the expansion which is responsive to the re-expansion tendency of the bale.

44. In a baling press, in combination, a press chamber having automatically operable means for the support of the bale compressed therein and also having a movable head which receives the thrust of the compressed bale, means for holding said head in a normal position and operable to permit and control its outward movement in response to the re-expansion tendency of the bale, thereby to relieve gradually the compression pressure on the bale, the said supporting means being operable throughout the said outward movement of said head, means for operating the said supporting means to release the bale and means of connection between the last named means and the head whereby said last named means also effects a further outward movement of the head beyond the outward movement thereof which is in response to the re-expansion tendency of the bale.

45. In a baling press, in combination, a press unit having a press chamber and a stationary head above the press chamber, the press chamber having a head arranged under and movable toward and from the stationary head, means associated with said press chamber and automatically operable to support the bale compressed therein, a cylinder incorporated with said stationary head, said cylinder being closed at its upper end and open at its lower end, a plunger carried by said movable head and operating in said cylinder, a fluid driven cap externally fitted over said cylinder, said cylinder having a fluid duct opening under said cap, means for the admission of oil to the interior of said cylinder, a valve controlling the escape of oil from said cylinder and operative connections between said cap and said bale supporting means whereby when said cap is moved by the pressure of fluid admitted between it and the closed end of said cylinder it will operate said supporting means to release the bale.

46. In a baling press, in combination, a press unit having a press chamber and a stationary head above the press chamber, the press chamber having a head arranged under and movable toward and from the stationary head, means associated with said press chamber and automatically operable to support the bale compressed therein, a cylinder incorporated with said stationary head, said cylinder being closed at its upper end and open at its lower end, a plunger carried by said movable head and operating in said cylinder, a fluid driven cap externally fitted over said cylinder, said cylinder having a fluid duct opening under said cap, means for the admission of oil to the interior of said cylinder, a valve controlling the escape of oil from said cylinder and operative connections between said cap and said bale supporting means whereby when said cap is moved by the pressure of fluid admitted between it and the closed end of said cylinder it will operate said supporting means to release the bale, said connections being yieldable independently of the operative movement of the cap, and being also connected to said movable head.

47. In a baling press, in combination, a press chamber having a movably mounted head, means acting automatically for supporting a bale compressed in said chamber, means for holding said head in its normal position and operable to permit its outward movement in response to the re-expansion tendency of the bale, means operative subsequent to the said outward movement of said head for operating said supporting means to release the bale and means whereby said head as it returns to its normal position is effective to re-set said supporting means.

48. In a baling press, in combination, a turret provided with a plurality of circumferentially spaced press units, each having a press chamber; means for the support of the bale compressed in said chamber and fluid driven means for operating said supporting means to release the bale, a fluid inlet connection located at the axial center of said turret, a fluid distributing chamber surrounding said fluid inlet connection and radially arranged fluid conducting pipes extending between said distributing chamber and the respective press units, said pipes each having a controlling valve therein.

49. In a baling press, in combination, a turret having a base, a table arranged at an elevation above said base and a cylindrical wall extending between and connecting said base and said table, a plurality of press chambers circumferentially spaced along and arranged above said table and extension boxes for said press chambers arranged below said table, the latter having openings registering with the enclosures delimited by said press chambers and extension boxes.

50. In a baling press, in combination, a turret having a base, a table arranged at an elevation above said base and a cylindrical wall extending between and connecting said base and said table, a plurality of press chambers circumferentially spaced along and arranged above said table and extension boxes for said press chambers arranged below said table, the latter having openings registering with the enclosures delimited by said press chambers and extension boxes, a frame base upon which the turret base is revolubly mounted and means for applying power to the turret base to effect the rotation of the turret.

51. In a baling press, in combination, a turret having a revolubly mounted base, a table arranged at an elevation above said base and a cylindrical wall extending between and connecting said base and said table, a plurality of press chambers circumferentially spaced along and arranged above said table and extension boxes for said press chambers arranged below said table, the latter having openings registering with the enclosures and extension boxes, a stationary preliminarily compression and loading chamber arranged below the extension boxes and adapted to register successively with said boxes as the table is rotated, a loading plunger vertically movable through said stationary chamber for the purpose of forcing a preliminarily compressed charge of material into the adjacent extension box and a second plunger operating at one side of said stationary chamber and movable through the extension boxes and into the press chambers to effect a high density compression of the preliminarily compressed bale.

52. In a baling press, in combination, a turret provided with a plurality of press units and having step-by-step rotation to bring each unit successively to sundry stations whereat the sequential baling operations are concurrently performed throughout the series of units and means for rotating the turret comprising an intermittently operated gear element adapted in one revolution to effect a step movement of said turret, a continuously rotatable shaft for the operation of said gear element and mounted co-axially therewith and a clutch connection between said shaft and gear element including a coupling pin automatically operative to rotate said gear element from said shaft and a lever automatically operated normally to hold said coupling pin disengaged, said lever being operable manually to release said coupling pin and being operable automatically to move said coupling pin into its disengaged position when the pinion has completed a revolution.

53. In a baling press, in combination, a turret provided with a plurality of press units and having step-by-step rotation to bring each unit successively to sundry stations whereat the sequential baling operations are concurrently performed throughout the series of units and means for rotating the turret comprising a concentric gear wheel carried thereby, an intermittently operated pinion in mesh with said gear wheel and adapted in one revolution to effect a step movement of said turret, a continuously rotatable shaft for the operation of said pinion and mounted co-axially therewith and a clutch connection between said shaft and pinion including a coupling pin automatically operative to rotate said pinion from said shaft and a lever automatically operated normally to hold said coupling pin disengaged, said lever being operable manually to release said pin and being operable automatically to move said coupling pin into its disengaged position when the pinion has completed a revolution.

54. In a baling press, in combination, a press chamber open at its lower end, means having an element movable at an angle to the axis of the press chamber for preliminarily compressing a bale and another element movable co-axially of the press chamber for loading the preliminarily compressed bale through the open lower end thereof and other means movable co-axially of the press chamber for compressing the bale to high density therein.

55. In a baling press, in combination, a press chamber open at its lower end, means having an element movable at an angle to the axis of the press chamber for preliminarily compressing a bale and another element movable co-axially of the press chamber for loading the preliminarily compressed bale through the open lower end, other means movable co-axially of the press chamber for compressing the bale to high density therein and means associated with the press chamber and acting automatically to support the bale as preliminarily and as densely compressed.

56. In a baling press, in combination, a press chamber having yieldable walls normally held in their operative positions, means for compressing a bale to high density in said press chamber, means for supporting the compressed bale, means for operating the supporting means to release the bale and means for holding said movable walls normally fixed and operable to permit the yielding of said walls in response to the re-expansion tendency of the bale, thereby to gradually relieve the compression pressure on the bale, said last named means normally preventing an operation of said operating means and permitting an operation thereof only after the compression pressure on the bale has been relieved.

57. In a baling press, in combination, a press chamber open at its lower end and having yieldably mounted walls, means for holding said walls normally fixed, means for preliminarily compressing a bale and loading it into said press chamber through said open lower end, means operating through said open lower end for compressing the bale to high density in said press chamber, means associated with the press chamber and acting automatically for supporting the bale both as preliminarily and as densely compressed, means in association with said holding means for permitting the gradual yielding of said walls in response to the re-expansion tendency of the bale, thereby to relieve gradually the compression pressure on the bale, and means for operating said supporting means to disengage the densely compressed bale, thereby to permit its discharge by gravity through the open lower end of the press chamber.

In testimony whereof I have hereunto set my hand in presence of two subscribing witnesses.

WARNER H. CAMP.

Witnesses:
LEE ROY CAMP,
JOHN S. POWERS.